United States Patent [19]

Maly

[11] Patent Number: 4,566,413

[45] Date of Patent: Jan. 28, 1986

[54] MIXTURE-COMPRESSION INTERNAL COMBUSTION ENGINE

[75] Inventor: Rudolf Maly, Sindelfingen, Fed. Rep. of Germany

[73] Assignee: Daimler-Benz Aktiengesellschaft, Fed. Rep. of Germany

[21] Appl. No.: 662,689

[22] Filed: Oct. 19, 1984

[30] Foreign Application Priority Data

Oct. 21, 1983 [DE] Fed. Rep. of Germany ....... 3338216

[51] Int. Cl.[4] ............................................. F02B 19/10
[52] U.S. Cl. .................................... 123/256; 123/193 P
[58] Field of Search ............. 123/256, 279, 285, 193 P

[56] References Cited

U.S. PATENT DOCUMENTS

| | | | |
|---|---|---|---|
| 1,944,352 | 1/1934 | Lang | 123/256 X |
| 3,797,466 | 3/1974 | Nambu | 123/256 |
| 3,897,769 | 8/1975 | Jozlin | 123/279 X |
| 4,128,092 | 12/1978 | Yokota et al. | 123/256 |
| 4,175,531 | 11/1979 | Tanahashi . | |

FOREIGN PATENT DOCUMENTS 500023 6/1930 Fed. Rep. of Germany ...... 123/279
1341030 9/1963 France .

Primary Examiner—Tony M. Argenbright
Attorney, Agent, or Firm—Craig and Burns

[57] ABSTRACT

A mixture-compression internal combustion engine has an auxiliary chamber opening into the combustion space via an injection duct, to which is allocated an ignition unit. In order to provide secure, rapid and large volume ignition of the fuel/air mixture, several auxiliary chambers open into the combustion space and the injection duct of a first auxiliary chamber is directed towards the injection duct of a further auxiliary chamber. Starting from the ignition unit allocated to the first auxiliary chamber the fuel/air mixture in the combustion space is ignited, and starting from the first auxiliary chamber, the mixture is ignited sequentially in the other auxiliary chambers.

8 Claims, 10 Drawing Figures

MIXTURE-COMPRESSION INTERNAL COMBUSTION ENGINE

The invention concerns a mixture-compression internal combustion engine having a combustion space with auxiliary chambers, of which a first auxiliary chamber having an ignition unit is located in the cylinder head and a second and one or more third auxiliary chambers are located in the piston, and having injection ducts which connect the auxiliary chambers to the combustion space, in which arrangement the injection ducts of the second and third auxiliary chambers open on the piston head side and are aligned in the peripheral direction of a flame front, and in which arrangement the injection duct of the first auxiliary chamber points in the direction of the injection duct of the second auxiliary chamber.

An internal combustion engine with a scavenged precombustion chamber is known from FIG. 9 of U.S. Pat. No. 3,283,751. The combustion space of the internal combustion engine and the scavenged precombustion chamber are connected by an injection duct. A sparking plug, which ignites the fuel/air mixture, is located above the injection duct in the cylinder head of the internal combustion engine. A flame front is propagated from the ignition point of the fuel/air mixture in the direction of the piston and also ignites the fuel/air mixture located in the precombustion chamber via the injection duct. Because of the excess gas pressure occurring in the precombustion chamber, a flame front passes rapidly through the injection duct, flows through a further injection duct and is deflected by the cylinder head in the direction of the piston head so that the fuel/air mixture located in the combustion space is ignited, in the main, by a flame front in the area of the piston center and by a further flame front located around the periphery of the internal space. A disadvantage of this arrangement, however, is that to ensure ignition of the fuel/air mixture in the scavenged precombustion chamber, a richer fuel/air mixture than in the combustion space is necessary. In order to effect this different mixture preparation, an extensive mixture formation installation is required. Due to the ignition, of the fuel/air mixture, introduced in the area of the piston center and around the periphery of the combustion space, uneven combustion with high HC emission occurs.

German Auslegeschrift No. 1,054,778 also reveals a mixture-compression internal combustion engine in which three sparking plugs are allocated to each combustion space, the two additional sparking plugs being connected to separate ignition current generators and firing in sequence. A disadvantage in this case, however, is that two further ignition current generators are required and at least one further control unit, which fires the two additional sparking plugs as a function of the ignition time of the first sparking plug and corresponding to the instantaneous load and speed range of the internal combustion engine. The additional requirements necessary with respect to additional components not only demand additional installation space but the further mass of components is also undesirable in the present-day light-weight construction of motor vehicles. In addition, the additional control unit introduces an increased risk of vehicle breakdown.

U.S. Pat. No. 4,128,092 also reveals an internal combustion engine in which auxiliary chambers are located in the combustion space, these being connected to the combustion space via an injection duct. A fuel/air mixture ignition unit is allocated to an injection duct of an auxiliary chamber located in the cylinder head. Injection ducts, which connect the auxiliary chambers to the combustion space, open on a plane piston head opposite to the cylinder head of the internal combustion engine, the injection ducts being aligned in the same sense in the peripheral direction of a flame front. A disadvantage of this arrangement, however, is that a flame front emerging from the injection duct is directed towards the boundary wall of the cylinder, experiences a change in direction and only then ignites the fuel/air mixture in the other auxiliary chambers. Due to the change in direction of the flame front taking place at the boundary wall of the cylinder, removed by a cooling circuit of the internal combustion engine and is therefore no longer available to the combustion space for heating the fuel/air mixture. Furthermore, the change in direction of the flame front at the boundary wall of the cylinder causes a divergent flame front so that auxiliary flame fronts are also deflected in the direction of the center of the piston and ignite the fuel/air mixture from there.

Fuel/air mixture ignition starting from the central region of the piston, however, has the consequence that a movement of charge is directed towards the boundary wall of the cylinder and causes wall heat losses.

An internal combustion engine is also known from U.S. Pat. No. 4,175,531 (FIG. 7) and this machine has a combustion space whose first auxiliary chamber located in the cylinder head is connected to an injection duct to which is allocated fuel/air mixture ignition equipment. A second auxiliary chamber is located in the piston head and its injection duct opens into the combustion space and is directed towards the injection duct of the first auxiliary chamber. There is no sequential ignition of the fuel/air mixture in the combustion space.

In addition, French Patent No. 1,341,030 reveals a self-igniting internal combustion engine whose cylinder includes a combustion space region and a cylinder space provided with auxiliary chambers. A disadvantage of this arrangement, however, is that a volume expansion occurs continuously during the working stroke due to the auxiliary chambers located in the cylinder space; this retards the progress of combustion so that the compression pressure is reduced and the efficiency of the internal combustion engine is reduced.

An object of the invention is to ignite the fuel/air mixture in an internal combustion engine with a combustion space having auxiliary chambers in such a way that wall heat losses are avoided as far as possible.

This object is attained, in accordance with the invention, by means of a piston provided with protuberances extending into the combustion space, in which protuberances a second auxiliary chamber and third auxiliary chambers point in the direction of piston troughs located between the protuberances.

Another object of the invention is the provision of a mixture-compression internal combustion engine wherein an ignition unit is located in a first auxiliary chamber which is connected to a combustion space by way of an injection duct.

Another object of the invention is the provision of a mixture-compression internal combustion engine wherein a piston has an angular piston trough around the periphery thereof, auxiliary chambers being located within radially projecting sections in a protuberance limiting the piston trough on the inside.

Another object of the invention is provision of a mixture-compression internal combustion engine wherein a piston surface has piston troughs of saw-tooth spaced profile radiating from the center of the piston with a depth of each of the troughs increasing towards the periphery of the piston, auxiliary chambers being located in the peripheral region of the piston in protuberances located between the piston troughs and injection ducts being pointed in the direction of gently sloping sides of the troughs.

Another object of the invention is the provision of a mixture-compression internal combustion engine wherein a cross-sectional area of an auxiliary chamber is at least about 30 times as large as the cross sectional area of an injection duct.

Another object of the invention is the provision of a mixture-compression internal combustion engine which overcomes the shortcomings of the prior art.

These and other objects, features, and advantages of the present invention will become more apparent from the following description when taken in connection with the accompanying drawings which show, for the purposes of illustration only, multiple embodiments in accordance with the present invention, and wherein FIG. 1 shows a longitudinal section through the center of a combustion space of an internal combustion engine;

The arrangement in accordance with the invention has the advantage that, because of the gas pressure occurring during the ignition of the fuel/air mixture in the precombustion chamber, a flame front emerging almost parallel to the piston surface through the injection duct ignites the fuel/air mixture located in the combustion space with a high propagation velocity in a manner which can be specified. Since the fuel/air mixture located in the combustion space is traversed and ignited by flame fronts at high velocity, the fuel/air mixture can be weakened and this reduces the CO emission. Reduction of the HC emission is attained by combustion proceeding from the periphery of the combustion space to the center of the combustion space because an increase in gas pressure in the combustion space is observed during the combustion of the fuel/air mixture and this forces the gases located in the combustion space into the annular space formed between the wall of the cylinder and a duct area of the piston. Because of the piston movement and a gas pressure difference between the annular space and the combustion space, the completely burnt gases are removed from the annular space during the scavenging operation.

In the case of internal combustion engines in which ignition occurs in the conventional manner, on the other hand, the fuel/air mixture is forced by the increase in gas pressure in the combustion space into the annular spaces formed between the cylinder and the duct area of the piston. These unburnt gases then escape from the annular spaces at the end of the combustion and during the scavenging operation and lead to increased HC emission.

In the ignition, in accordance with the invention, of the fuel/air mixture, the ignition time can be displaced towards "late" and this reduces the $NO_x$ emission.

A further advantage is provided by the minimum wall heat losses. The ignition of the fuel/air mixture introduced at the periphery of the combustion space propagates in the direction of the central axis of the piston. The movements in the gas mixture occurring during ignition are compensated by the flame front reaching the central axis of the piston almost simultaneously and by the expansion movement of the piston so that the gas mixture is practically immobile. Due to this small movement of the gas mixture, the heat exchange between the gas mixture and the walls forming the boundaries of the combustion space is very small.

Figure 1:
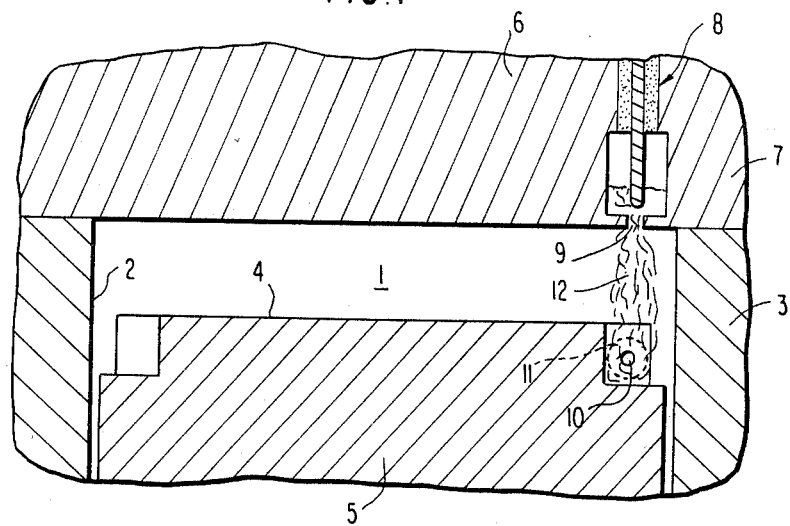

Turning now to the drawings wherein like elements are represented by like reference numerals, a combustion space, indicated by 1 in FIG. 1, of an internal combustion engine, not shown in any more detail, is limited by the boundary wall 2 of the cylinder sleeve 3, by a piston surface 4 of the piston 5 and by a cylinder head 6. A first auxiliary chamber 7 having a fuel/air mixture ignition unit 8 is connected to the combustion space 1 via an injection duct 9. The injection duct points in the direction of an injection duct 10 which connects a second auxiliary chamber 11, located in the piston 5, to the combustion space 1.

Figure 2:
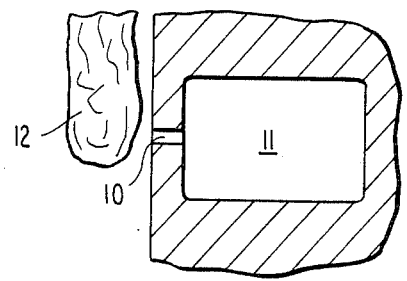
FIGS. 2-5 show a flame front propagation in the combustion space as a function of the fuel/air mixture combustion in a precombustion chamber shown in longitudinal section.
Figure 3:
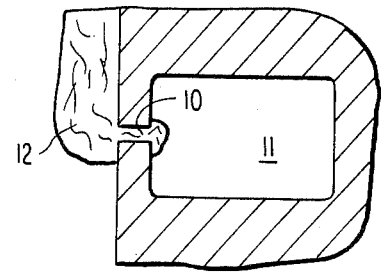
Figure 4:
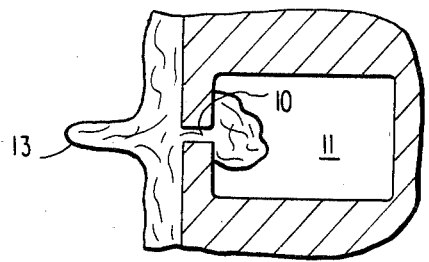
Figure 5:
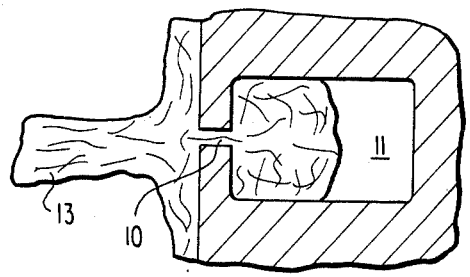

Ignition of the fuel/air mixture located in the combustion space 1 and in the second and third auxiliary chambers 11 of the piston 5 takes place by means of the ignition unit 8 in the first auxiliary chamber 7. A flame front 12 forms through the injection duct 9 of the first auxiliary chamber 7 in the direction of the injection duct 10 the second auxiliary chamber 11. The fuel/air mixture located in the auxiliary chamber 11 is ignited through the injection duct 10 by the flame front 12, as shown in FIGS. 2 and 3. Due to the combustion of the mixture in the auxiliary chamber 11, an excess gas pressure forms in the latter relative to the combustion space 1 and this comes into equilibrium with the combustion space 1 via the injection duct 10. By this means, a further flame front 13 is formed and this is directed towards an injection duct of a third auxiliary chamber, as shown in FIGS. 4 and 5.

Figure 6:
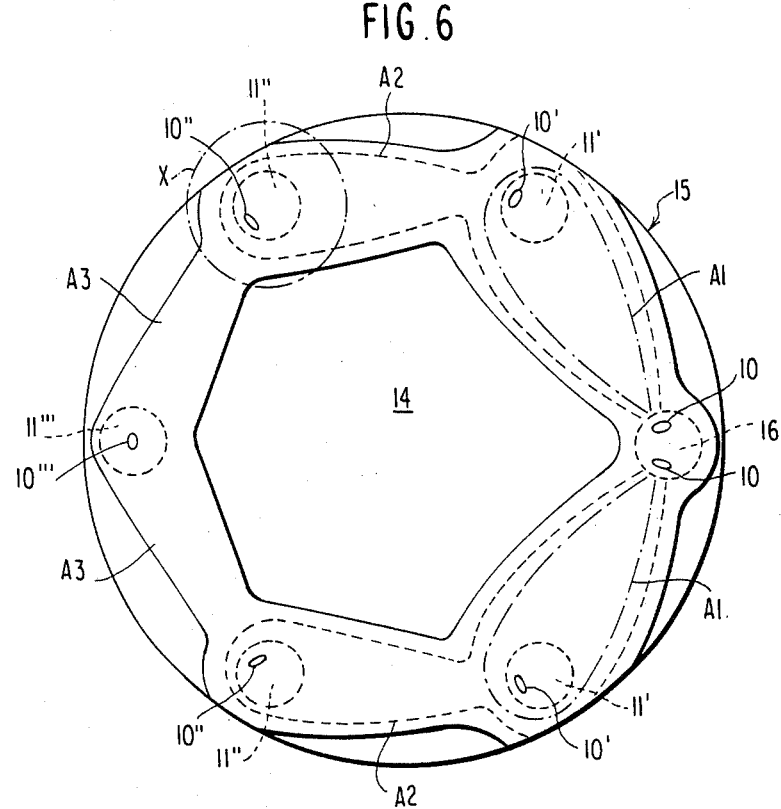
FIG. 6 shows a sequential flame front propagation with auxiliary chambers located in the piston head.

A piston head 14, shown in FIG. 6, of a piston 15 has injection ducts 10 ending on the piston head side and these connect the auxiliary chambers 11 to a combustion space which is not shown in detail. If the fuel/air mixture is ignited in the region of an auxiliary chamber 16 having two injection ducts, a flame front escapes from each of these two injection ducts to an injection duct 10 of the third auxiliary chambers 11'-11'''. At a point in time $t_1$, a flame front emerging from the auxiliary chamber 16 has ignited the fuel/air mixture in a third auxiliary chamber 11'. At this point in time, the flame front has propagated to an extent indicated by A1. The flame front emerging from the injection duct 10' propagates in the direction of a further auxiliary chamber 11'', the total flame propagation front having an extension indicated by A2 at a point in time $t_2$. A further auxiliary chamber 11''' is ignited by the flame front previously escaping from the injection duct 10'''. At a point in time t₃, the total flame front has the extension indicated by A3. The ignition of the fuel/air mixture introduced at the periphery of the combustion space propagates in the direction of the central axis of the piston. The movement in the gas mixture occurring during ignition is compensated by the flame front almost simultaneously reaching the central axis of the piston and by the expansion movement of the piston so that the gas mixture is practically immobile. The heat exchange between the gas mixture and the walls forming the boundaries of the combustion space is very small because the movement of the gas mixture is small.

Figure 7:
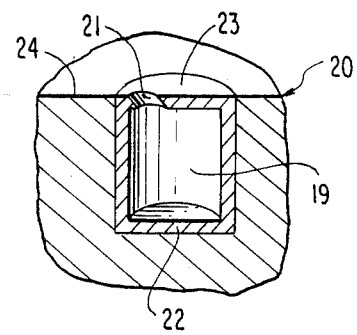
FIG. 7 shows, in longitudinal section, a precombustion chamber located in the piston head from a detail indicated by "X" in FIG. 6.

An auxiliary chamber 19, shown in FIG. 7, is bonded by a cylindrical casing 22 inserted in a piston 20, this casing 22 having an injection duct 21 connecting the combustion space and the auxiliary chamber 19. A closing part 23 which closes the cylindrical casing 22 on the combustion space side is located in plane with the piston head 24 of the piston 20.

Figure 8:
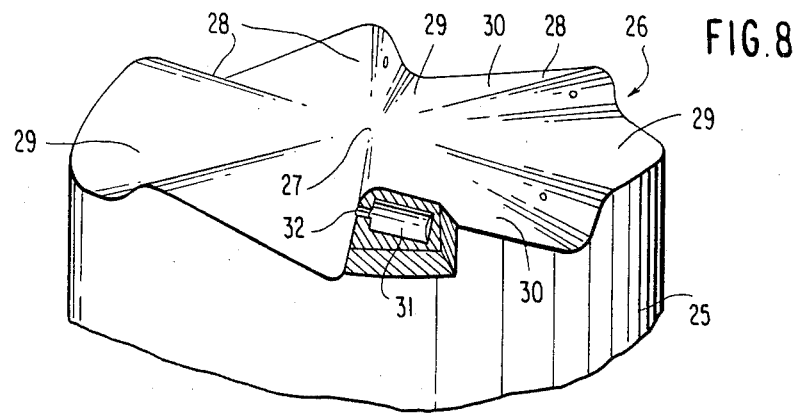
FIG. 8 shows a piston with multiple combustion troughs.

A piston 25 shown in FIG. 8 has a piston surface 26 from whose center 27 piston troughs 29 of saw-tooth shaped profile radiate. The trough depth increases radially in the direction of the periphery of the piston 25. The auxiliary chambers 31 are located in the peripheral region of the piston 25 in the protuberances 28 located between the piston troughs 29 and the injection ducts 32 point in the direction of the gently sloping sides 30 of the troughs.

Figure 9:
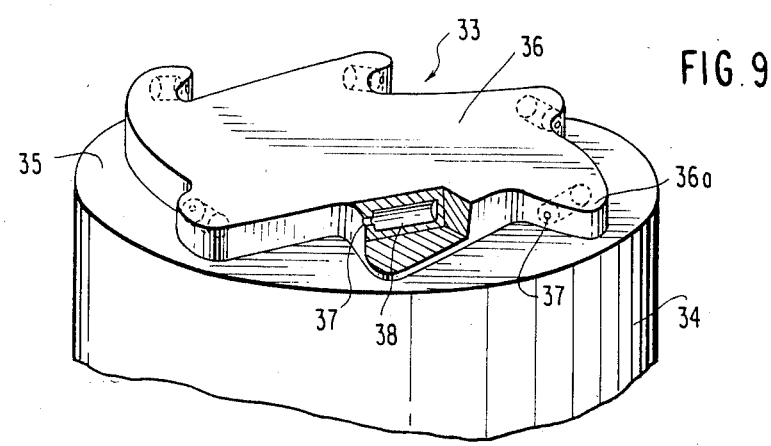
FIG. 9 shows a piston with a combustion trough running around the periphery.

Another piston head 33, shown in FIG. 9, of a piston 34, has an annular-shaped piston trough 35 around the periphery, the auxiliary chambers 38 being located within the radially protruding sections 36a in a protuberance 36 limiting the piston trough 35 on the inside. The injection ducts 37 are aligned in the same sense in the peripheral direction of the flame front.

Figure 10:
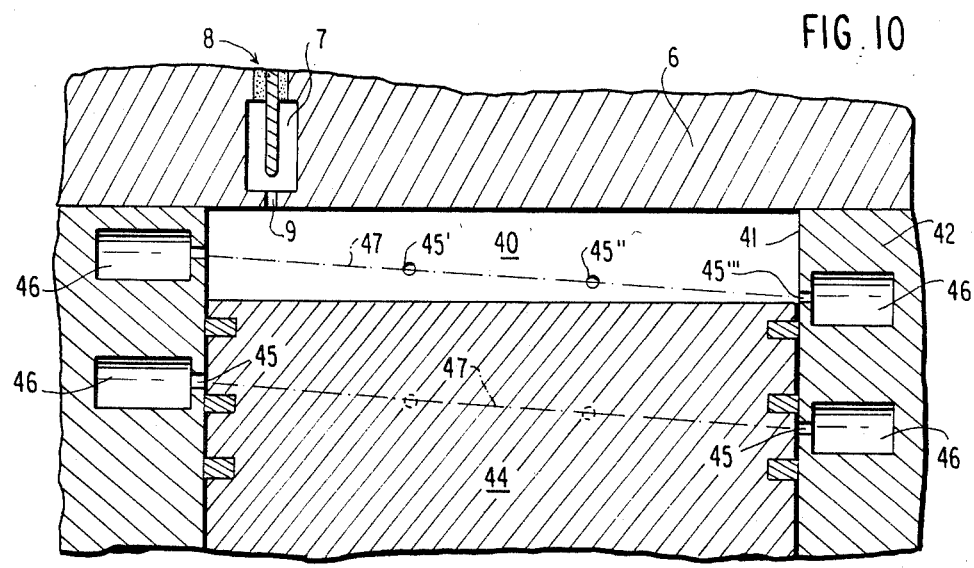
FIG. 10 shows a longitudinal section through the center of a combustion space of an internal combustion engine.

A combustion space, indicated by 40 in FIG. 10, of an internal combustion engine, not shown in detail, is limited by the boundary wall 41 of a cylinder sleeve 42, by a piston surface 43 of a piston 44 and by the cylinder head 6. The cylinder head 6 has the ignition unit 8, for the fuel/air mixture, located in the first auxiliary chamber 7. The combustion space 40 is connected to the auxiliary chamber 7 by means of the injection duct 9. Injection ducts 45, which connect the combustion space with the further auxiliary chambers 46 located along a helical line in the cylinder sleeve 42, also open onto the boundary wall 41 of the cylinder sleeve 42.

The flame front propagation occurs in an analogous manner to that described in FIGS. 1 to 6. The only difference is that the injection duct 45 of the auxiliary chamber 46, opening in the boundary wall 41 of the cylinder sleeve 42 points towards an injection duct 45' of a further auxiliary chamber 46, located along the helical line 47 in the boundary wall 41 of the cylinder sleeve 42, which injection duct is directed towards the injection duct 45" of a further auxiliary chamber 46, which in turn points towards injection duct 45''' of auxiliary chamber 46''' and so on along the helical line 47.

While I have shown and described several embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A mixture-compression internal combustion engine having a combustion space with auxiliary chambers, of which a first auxiliary chamber having an ignition unit is lcoated in the cylinder head and a plurality of further auxiliary chambers located in the piston, and having injection ducts each of which connects a further auxiliary chamber to the combustion space, the injection ducts of the further auxiliary chambers open on a surface of the piston head and are aligned in a direction to produce a flame front propagated in a peripheral direction, and in which arrangement the injection duct of a first of said further auxiliary chambers points in the direction of an injection duct of a second auxiliary chamber, characterized in that the piston is provided with peripherally disposed proturberances each encompassing an auxiliary chamber extending into the combustion space, in which each of said ducts of further auxiliary chamber points in the direction of a piston trough located between each of the protuberances.

2. A mixture-compression internal combustion engine according to claim 1, characterized in that the ignition unit located in the first auxiliary chamber is connected to the combustion space via an injection duct.

3. A mixture-compression internal combustion engine according to claim 1, characterized in that the piston has an annular piston trough around the periphery of the piston, the further auxiliary chambers being located within radially projecting sections in the protuberance and serving to limit the extent of the piston trough measured along the periphery of the piston.

4. A mixture-compression internal combustion engine according to claim 1, characterized in that the piston surface has piston troughs of saw-tooth shaped profile radiating from the center and with the depth of each of the troughs increasing towards the periphery of the piston, the further auxiliary chambers being located in the peripheral region of the piston in the protuberances located between the piston troughs and the injection ducts being pointed in the direction of an adjacent gently sloping side of a trough.

5. A mixture-compression internal combustion engine according to claim 1, characterized in that the cross-sectional area of an auxiliary chamber is at least about thirty times as large as the cross-sectional area of its injection duct.

6. A mixture-compression internal combustion engine in accordance with claim 1, wherein
the flame front immobilizes the air/fuel mixture as the flame front proceeds toward the center of the combustion space.

7. A mixture-compression internal combustion engine for reducing heat exchange in a combustion chamber between a gas mixture and cylinder and piston walls forming boundaries of the combustion chamber comprising
means for introducing a fuel/air mixture at the periphery of the cylinder walls,
a multiplicity of chamber means disposed at the periphery of the piston for receiving the fuel air mixture introduced for propagating combustion along the periphery of the piston and cylinder walls for causing the flame front to almost simultaneously reach the central axis of the piston to substantialy immobilize the gas mixture as the movement of the piston expands the combustion chamber.

8. A mixture-compression internal combustion engine according to claim 7, wherein the multiplicity of chamber means are disposed in at least one of the cylinder wall and the piston.

* * * * *